Oct. 27, 1970

D. R. STEVENS ET AL 3,536,820

BEZEL ASSEMBLY

Filed Aug. 1, 1968

INVENTORS.
DONALD R. STEVENS
DONALD BRUHNS.
BY Christie, Parker & Hale
ATTORNEYS.

3,536,820
BEZEL ASSEMBLY
Donald R. Stevens, North Hollywood, and Donald Bruhns, Colton, Calif., assignors to Industries Electronics Engineers, Inc., Van Nuys, Calif., a corporation of California
Filed Aug. 1, 1968, Ser. No. 749,328
Int. Cl. H05k 9/00
U.S. Cl. 174—35 2 Claims

ABSTRACT OF THE DISCLOSURE

A bezel assembly for use with panel readout assemblies. The bezel assembly contains a viewing screen and is designed to provide a radio frequency interference (RFI) attenuating closure across the panel opening associated with the readout assembly. RFI shielding is provided by disposing a one piece, planar, electrically conductive grid across the bezel aperture in electrical contact with electrically conductive panel surfaces. The assembly may also be sealed against the entry of moisture by gasketing the bezel aperture and around the outside perimeter of the bezel plate.

BACKGROUND OF THE INVENTION

The present invention relates to the electromagnetic shielding and moisture sealing of metallic panel openings and in particular to bezel assemblies for use with readout assemblies associated with said openings.

DESCRIPTION OF THE PRIOR ART

Bezels and bezel assemblies as used in the present context refer to the components which are normally affixed around an opening in a metallic plate such as an instrument panel for the purpose of framing and mounting gauges, readouts, etc. to make the mounting easier and more economical and to define the viewing area of the framed indicia more clearly.

Among other problems encountered in the environment in which such assemblies are used are the panel openings with which the bezel assemblies are associated provide a point of easy transfer of undetermined levels of radio frequency interference (RFI) from and into the general area and equipment mounted adjacent the panel. Where heavy concentrations of electronic or electrical equipment are involved, random electromagnetic radiation in the radio frequency range (RFI) must be minimized to insure proper operation. In addition, the condensation or splashing of moisture and liquids in the areas in which the bezel abuts the panel can be a source of trouble to the equipment mounted within. Where the panels are located in close proximity to operators such as air controllers at their consoles or airplane pilots in their cockpits, the danger of liquids such as coffee, etc. being splashed and leaking behind the panel is relatively great.

SUMMARY OF THE INVENTION

The present invention provides an assembly and method which severely attenuates radio frequency interference through a panel opening in which a component to be viewed is mounted without substantially interfering with observation of the indicia on the component. In addition, the invention reduces or eliminates the problems enumerated above.

In a first aspect of the invention there is provided a radio frequency interference shielded bezel assembly for mounting over a panel opening comprising a bezel plate having an aperture for framing a portion of the panel opening and viewing panel disposed overlapping the perimeter of the bezel plate aperture. An electrically conductive grid mesh is disposed overlapping the perimeter of the bezel plate aperture adjacent the viewing panel and means for securing the viewing panel and grid mesh between the bezel plate and panel is provided such that the grid mesh is in electrical contact with the panel.

In a second aspect of the invention there is provided a method of shielding radio frequency interference against passage through an opening in an electrically conductive panel comprising the steps of providing a continuous, integral, planar layer of conductive material and working a central portion of intersecting conductors defining a grid mesh bordered by an enclosing perimeter into the material. The layer is then disposed over an opening in a bezel plate, the bezel plate opening being approximately congruent with the panel opening. The bezel plate and layer assembly is centered and affixed over the panel opening and the perimeter of the conductive material is connected in electrical circuit relationship with the conductive panel.

By the foregoing an assembly such as a bezel assembly prevents access through the panel opening of radio frequencies in approximately the range of 10 kilohertz to 40 megahertz with high efficiency and with decreasing efficiency of frequencies from 40 megahertz to approximately 10 gigahertz. In addition, the assembly is adaptable to such situations as where dew point humidity conditions exist causing extreme condensation or where the readout assemblies are mounted adjacent to equipment that may splash liquids onto the readout panel surface to thereby prevent access of this moisture to the inside of the panel.

In addition to this primary application, the conductive grid screen of the present invention can be used in several auxiliary applications as well. Among these applications are contemplated use as a band pass filter for microwave frequencies in a waveguide.

BRIEF DESCRIPTION OF THE DRAWINGS

The foregoing and other advantages of the present invention will be better understood by reference to the figures of the drawing wherein.

DESCRIPTION OF THE PREFERRED EMBODIMENTS

Figure 2:
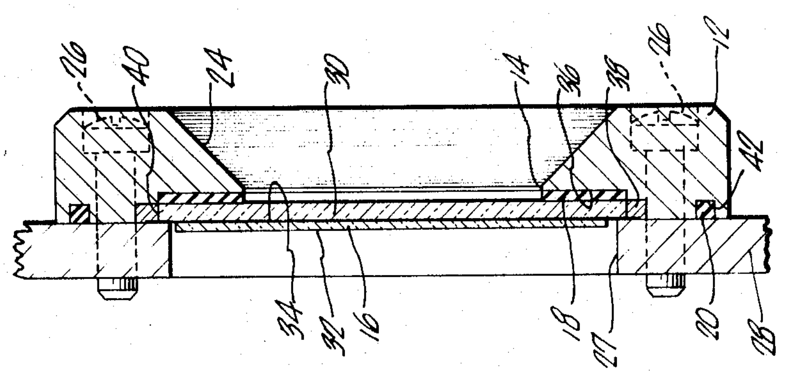
FIG. 2 is a view taken along lines 2—2 of FIG. 1.
Figure 1:
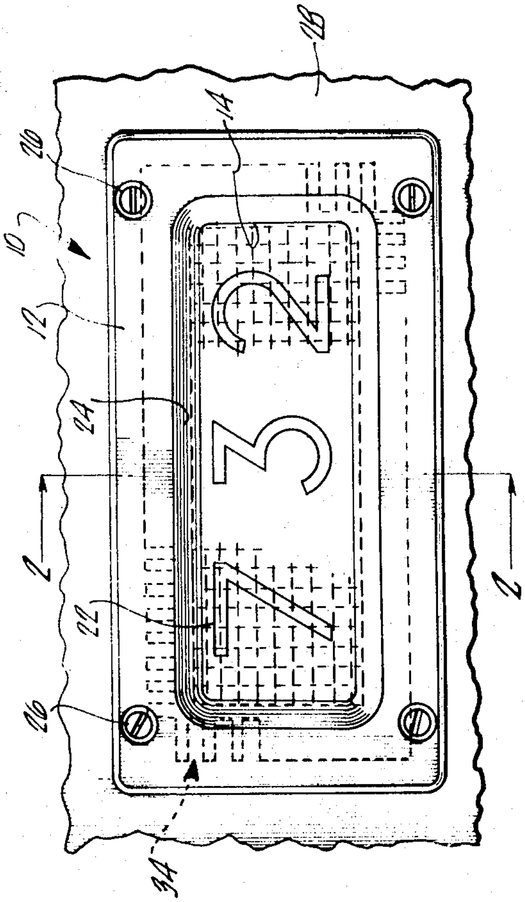
FIG. 1 is a front elevation of a bezel assembly according to the present invention for use with rear projection readout devices.

Referring now to FIGS. 1 and 2, there is shown in front elevational and sectional views a bezel assembly 10 such as is used for panel displays. The assembly comprises a bezel plate 12 having an aperture 14, a grid screen assembly 16, an inner gasket 18 and an outer gasket 20. Located interiorly of the bezel and grid screen assembly is a rear projection readout 22 or other device which generates indicia or messages. The bezel assembly replaces standard viewing screens fitted in precise panel cutouts. Sloping face 24 is preferably designed to provide a 90° included viewing angle in both the horizontal and vertical planes when maximum size charatcers are displayed on the viewing screen. Fastening means 26 such as countersunk screws secure the bezel assembly in position over an opening 27 in a panel 28.

Referring specifically to FIG. 2, the grid screen assembly 16 comprises a pair of transparent viewing sheets or panels 30 and 32, respectively. Where the instrument located behind the panel opening is a meter or a gauge, a preferred plate material for each of said panels is a heat resistant, acrylic plastic sheet. In cases where the instrument is a rear projection readout, plate 32 is suitably coated to serve as a translucent rear projection viewing screen. The contrast and readability of the displayed indicia can be still further improved by treating the outer surface of plate 32 for glare reduction, and by fabricating plate 32 from circular polarizing optical filter material. Sandwiched between panels 30 and 32 is a layer of conductive material 34 fabricated primarily in the form of a grid mesh of intersecting conductors. Grid 34 shields and prevents radio frequency interference against passage through the opening in panel 28 without significantly limiting visual access to indicia displayed behind the grid. The structural details of grid 34 will be described at greater length in conjunction with the description of FIGS. 3 and 4.

Grid screen assembly 16 is located in a detent 36 bordering aperture 14 in the bezel plate. Front plate 30 of the grid screen assembly serves as a window for viewing the associated indicia and seats against inner gasket 18 which is adhesively secured in detent 36 and extends around the perimeter of aperture 14. Gasket 18 and plate 30 are secured against each other so as to prevent the ingress of moisture through the panel opening at any point along the perimeter of aperture 14.

At the outer perimeter of gasket 18 and located in detent 36 in the bezel plate assembly is a gasket 38 which extends around the perimeter of the panel opening 27 and abuts the outside edge 40 of plate 30. Grid mesh 34 is provided with width and length dimensions slightly greater than the corresponding dimensions of plate 30 so that the outer perimeter of the mesh extends over and connects in a secure electrical contact with panel 28 under pressure exerted by gasket 38. In a preferred embodiment gasket 38 is fabricated of an electrically conductive material such that grid mesh 34, gasket 38, bezel plate 12 and panel 28 constitute one electrically conductive unit.

Panel 32 is located on the side of grid mesh 34 opposite plate 30 and has dimensions slightly smaller than the dimensions of both grid mesh 34 and panel 30. Panel 32 is held in position against grid 34 by securing means (not shown). Completing the assembly is an outer gasket 20 located in a second detent 42 in bezel plate 12 intermediate the perimeter of plate 12 and gasket 38. Gasket 20 is dimensioned such that when the bezel plate assembly 10 is secured to panel 28 by securing means 26 a moisture-tight seal is established preventing ingress of moisture past gasket 20 to the panel opening. Gasket 20 is preferably adhesively secured in detent 42. Securing means 26 may be advantageously provided with gasketing means (not shown) when required to further assure integrity of the overall moisture-tight seal.

The opening in the panel is thus shielded against the passage of radio frequency interference (RFI) through the panel opening by means of grid mesh 34 and is also gasketed at the viewing window and around the outer perimeter of the bezel plate to preclude moisture ingress to or through the panel opening. The grid forms an RFI barrier across the entire viewing opening and connects electrically with the panel along all four sides of aperture 14. In a first preferred embodiment, an elastometric material filled with metallic wire, granules or powder is used as the electrically conductive gasket 38. A second preferred embodiment utilizes a wire mesh gasket. In both embodiments positive electrical contact of grid mesh 34 with a plate 12 is provided as is uninterrupted grounding of the bezel plate 12 to panel 28, thus preventing any RFI leakage between plate 12 and panel 28. As will be discussed in more detail in conjunction with FIGS. 3 and 4, in the preferred embodiment the spaces between intersecting conductors and the dimensions of these conductors in grid 34 are chosen so as to provide not less 90% open area across the bezel window opening to provide the maximum readability of the displayed indicia and minimum loss of light intensity consistent with adequate radio frequency shielding.

In a preferred embodiment grid mesh 34 is fabricated by photoetching from an integral, continuous, planar sheet of a conductive material such as a nickel-copper alloy which is gold plated for conductivity over the entire length and breadth of the part. The mesh 34 may also be produced by directly printing or lithographing an etching resist onto the base material and then etching away the unprotected areas according to the conventional techniques.

Figure 3:
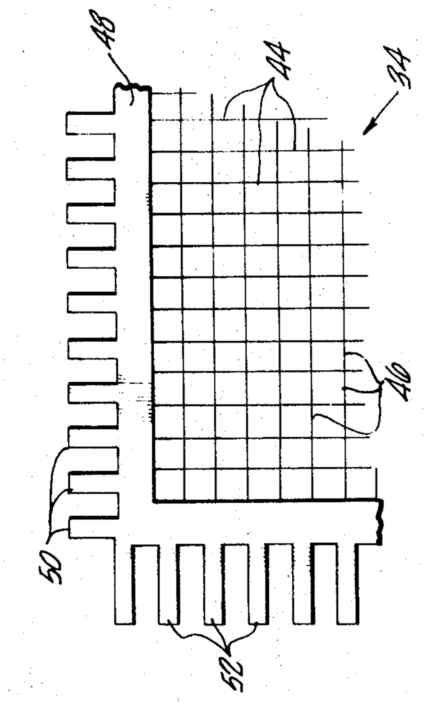
FIG. 3 is a detailed view of the metal grid used for shielding radio frequency interference.

Referring to FIG. 3, the grid layer comprises a central portion of intersecting vertical conductors 44 and horizontal conductors 46, a border strip 48 enclosing the central portion, and a plurality of vertical contact fingers 50 and horizontal contact fingers 52 integral and continuous with strip 48. The etched central grid-bordering strip-contact finger configuration is a thin, flat sheet or layer which lends itself extremely well to its sandwiched disposition between plates 30 and 32 of grid screen assembly 16. To improve electrical contact the fingers are "spring," i.e., deflected from the plane of the grid layer such that when disposed in the assembly the fingers are deflected from their rest position. In certain embodiments contemplated the grid mesh 34 is provided without contact fingers 50 and 52 and electrical contact with panel 28 is established by soldering or welding.

Figure 4:
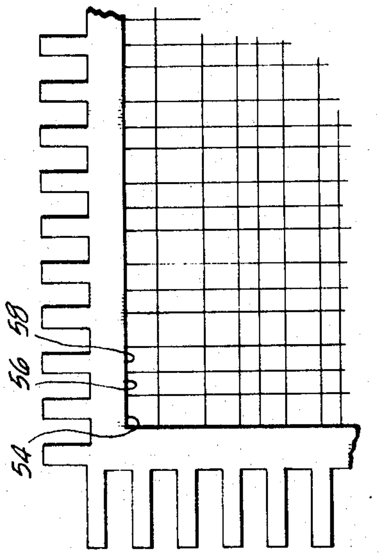
FIG. 4 is another embodiment of the grid shown in FIG. 3.

In one embodiment the spaces between the vertical and horizontal conductors of grid layer 34 are $\frac{1}{16}$ inch squares and are capable of reducing or attenuating RFI incident on the grid by approximately 80 db in a frequency range between 10 kilohertz and 40 megahertz. Beyond 40 megahertz this attenuating efficiency diminishes in approximately a straight line relationship to approximately 40 db at a frequency of 10 gigahertz.

Where the grid pattern of grid layer 34 is uniform as in FIG. 3, it has been found that a standing wave is created on the grid screen whose wavelength is four (4) times the dimensions of the sides of one of the grid spaces. For the frequency rang above, the standing wave created has a frequency of approximately 50 gigahertz. It has been found that harmonic frequencies of this standing wave are not efficiently shielded by the grid screen assembly where the grid pattern is uniform. To compensate, where it is desired to do so, a grid screen such as shown in FIG. 4 is employed in which the grid pattern is deliberately distorted and made non-uniform. In one embodiment, taking the dimensions of aperture 54 in the grid screen as unity, the relationship of the dimensions of adjacent apertures 56 and 58 is such that the horizontal dimensions are 0.7 and 0.8 respectively. The same pattern of distortion is imposed in the vertical direction. By providing such deliberate distortion it has been found that the screen is effective in attenuating standing wave harmonics by at least 40 db.

What has been described is a bezel assembly for use with a sub-panel readout assembly. The assembly provides a viewing panel for readout devices, meters, etc. mounted behind the panel and is designed to provide a moisture-proof, RFI attenuating closure across the panel opening with which the devices are associated. The foregoing description of the preferred embodiments is given by way of illustration only and is not intended to be taken as limiting of other possible variations within the scope of the invention.

What is claimed is:

1. A grid screen for radio frequency interference shielding comprising:

a continuous, planar, integral layer of conductive material having a meshed portion defining a non-uniform pattern of grid spaces for shielding harmonic frequencies of the primary frequency to be shielded;

a continuous border integral with and extending around the perimeter of the central portion; and a plurality of tabs extending from said border on the side thereof opposite the meshed central portion.

2. A method of shielding radio frequency interference against passage through an opening in an electrically conductive panel comprising the steps of:

(1) providing a continuous, integral planar layer of conductive material;

(2) working a central portion of intersecting conductors defining a grid bordered by an enclosing perimeter into the material, the relative position of said intersecting conductors being arranged so as to provide adjacent grid spaces of different sizes to thereby reduce the transmission through the material of harmonic frequencies of a standing wave created on the grid.;

(3) working a plurality of tabs into the perimeter portion of the material on the edge thereof opposite the central grid portion;

(4) permanently deflecting said tabs from the plane of the central and border portion;

(5) disposing the layer over an opening in a bezel plate, the bezel plate opening being approximately congruent with the panel opening; and (6) centering and affixing the bezel plate and layer assembly against the conductive panel opening in electrical circuit relationship with the conductive panel such that said tabs are deflected from their rest position.

References Cited

UNITED STATES PATENTS

| | | | |
|---|---|---|---|
| 3,177,334 | 4/1965 | Kinkle ----------- | 219—10.55 |
| 3,305,623 | 2/1967 | Bakker et al. | |
| 3,431,348 | 3/1969 | Nellis et al. | |

DARRELL L. CLAY, Primary Examiner

U.S. Cl. X.R.

29—592; 219—10.55